UNITED STATES PATENT OFFICE.

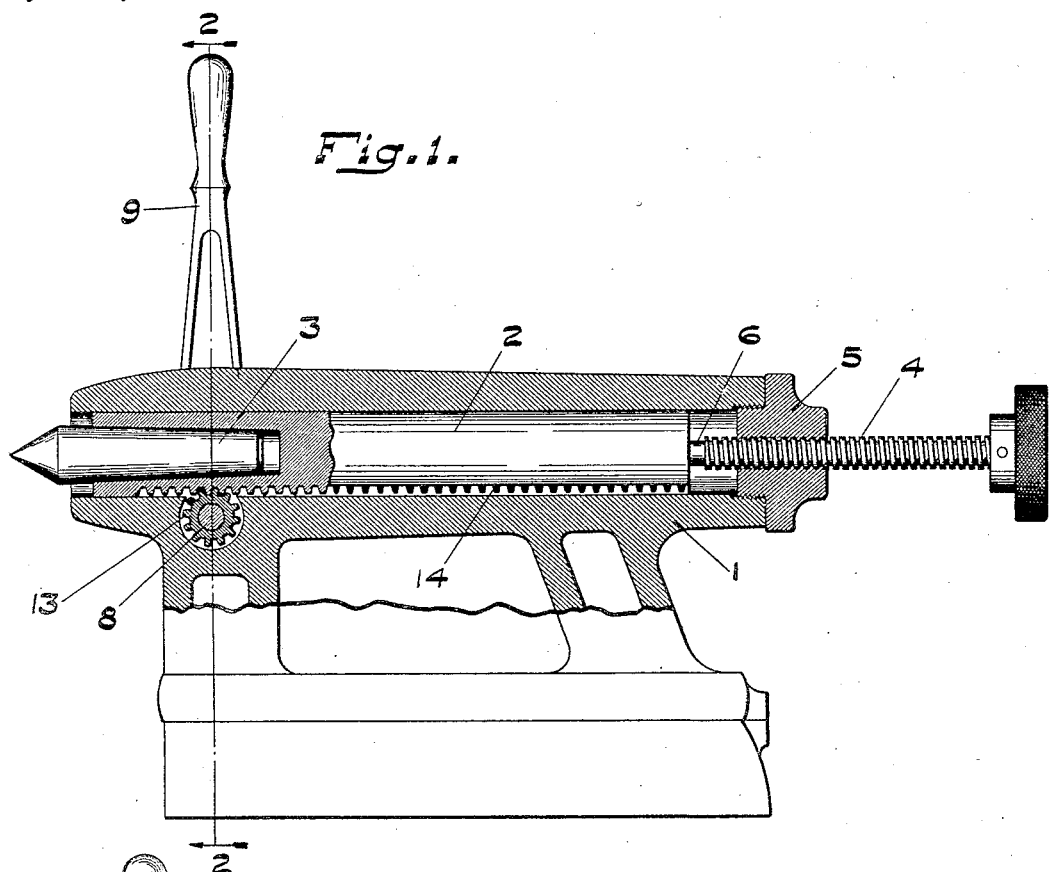
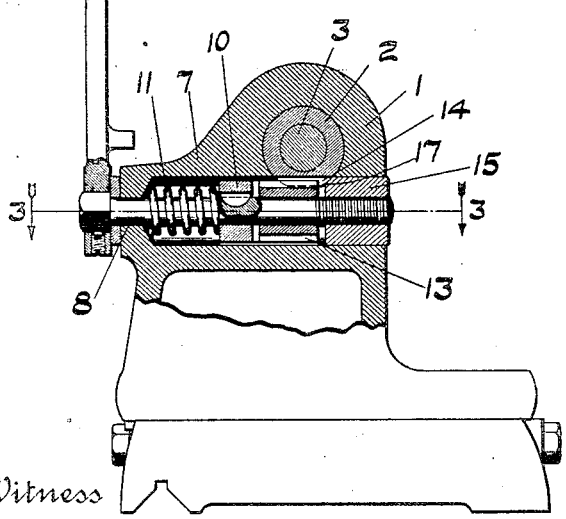
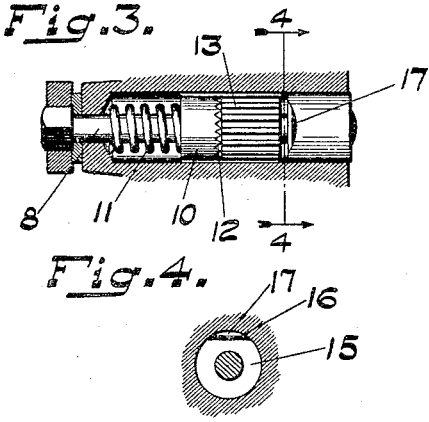

NICHOLAS D. CHARD, OF NEWCASTLE, INDIANA.

LATHE-CENTER ADJUSTING AND CLAMPING MEANS.

1,239,352.  Specification of Letters Patent.  Patented Sept. 4, 1917.

Application filed November 13, 1916. Serial No. 131,104.

*To all whom it may concern:*

Be it known that I, NICHOLAS D. CHARD, a citizen of the United States, residing at Newcastle, Henry county, and State of Indiana, have invented and discovered certain new and useful Improvements in Lathe-Center Adjusting and Clamping Means, of which the following is a specification.

My invention relates to adjusting and clamping means for lathe centers, and its object is to provide means whereby the center may be moved against the work held in the lathe and clamped in position by a single short movement of an operating member connected to the spindle, thereby avoiding the time now required for advancing and retracting the lathe center to permit of the insertion and removal of each piece of work by means of the usual tail stock screw which requires several revolutions of its handle for each operation and also saving the time now required for operating an additional handle employed to set a center-clamping eccentric or other locking means.

With this object in view, my invention is embodied in preferable form in the construction and arrangement hereinafter described and illustrated in the accompanying drawings.

In the drawings, Figure 1 is a side view in elevation, partly in vertical section, of a tail stock of a lathe showing my invention applied thereto; Fig. 2, a vertical section on the line 2—2 of Fig. 1; Fig. 3, an enlarged detail on the line 3—3 of Fig. 2 and Fig. 4, a detail cross section on the line 4—4 of Fig. 3.

Referring to the drawings, 1 indicates the tail stock of a lathe and 2 a spindle therein and 3 a lathe center which is held in a socket in the spindle. The spindle is pressed against at its outer end by a limiting stop screw 4 threaded into the collar 5 at the end of the tail stock and which screw is of the usual construction as that now generally employed for the spindle-adjusting screw except that it has a plain unthreaded end 6 bearing against the tail spindle and, therefore, serves merely as a stop to prevent the rearward movement of the spindle and determine its position within the casing and does not serve as means for retracting the spindle and center as is usually done. This stop screw serves to measure the ultimate range of movement of the center between the stop and the work and to obtain an approximate degree of adjustment while leaving a clearance for the work but the spindle and stock are movable independently thereof within the distance fixed by the stop to obtain the necessary engaging and releasing actions of the center relatively to the work.

Journaled in a sleeve 7 extending at right angles to the spindle is a shaft 8 having fixed to its outer end an oscillatory lever handle 9 movable on an axis at right angles to the axis of the spindle. Keyed on this shaft so as to be held against rotatable movement but be capable of a sliding movement longitudinally thereof is one member 10 of a ratchet clutch having inclined teeth and bearing against this clutch member is a spiral spring 11, the other end of which bears against the wall of the sleeve, whereby the clutch member is normally pressed inward. Coöperating with this clutch member is a second clutch member 12 also having ratchet teeth which are adapted to mesh with and also ride upon the teeth of the first clutch member. The second clutch member 12 is carried by a pinion 13 loosely mounted on the shaft 8 and adapted to engage a rack 14 formed on the under surface of the tail stock spindle, whereby the spindle and center are adapted to be moved back and forth. The inner end of the shaft 8 is threaded and is adapted to engage a threaded annular dog 15 which is caused to travel longitudinally of the shaft by the action of the interengaging screw threads when the shaft is rotated. This dog is provided with a flat shoulder 16 formed by a recess on the periphery of the dog and adapted to bear against the flattened surface of the spindle adjacent the rack to prevent rotation of the dog. A curved shoulder 17 rises from the surface 13 and is cut on the same radius as that of the spindle and which when carried inward into engagement with the lower surface of the spindle is adapted to lock the latter by friction against longitudinal movement.

In the operation of the device, the screw 4 is so adjusted as to advance the spindle and center or permit them to be retracted to obtain a distance between centers approximating the length of the work plus sufficient clearance to permit the independent movement of the center and spindle in its clamping and releasing actions, and the work is then inserted between the centers. Then the lever handle 9 is thrown forward toward the work, which action will rotate the shaft 8 and through the pressure of the spring 11 cause the teeth of the clutch member 10 to mesh with the clutch member 12 carried by the pinion 13, whereupon by the rotation of the pinion and the engagement thereof with the rack 14, the spindle will be carried forward so as to advance the center against the work. When the center contacts with the work, the resistance thus encountered will check the movement of the spindle and pinion, and the back pressure thus exerted will cause the clutch member 10 to yield against the pressure of the spring and the teeth of the two clutch members will ride upon one another, thus disconnecting the clutch and stopping the travel of the spindle and center. The shaft 8, however, will continue its rotation and in such movement the threads on the end of the shaft will cause the threaded dog 15 to travel inward until its stop shoulder 17 is carried against the under surface of the stock, whereupon the spindle and center will be clamped rigidly in position.

It will thus be seen that the center is advanced against the work and the center and spindle locked in position by one movement in the same direction of the operating handle. To withdraw the center from engagement with the work, the handle is moved back whereupon the first part of its movement will be directed toward unscrewing the dog 15 from engagement with the spindle so as to release the latter and as soon as such release has been effected, the spring will force the two clutch members into engagement, whereupon the further rotation of the shaft will be effective in moving the spindle and center back by the engagement of the pinion teeth and rack teeth.

By the above arrangement, it will be seen that the center may be adjusted and locked by a single swinging movement of the operating handle in one direction and released and withdrawn by a single movement in the other direction, thus effecting a great saving in time as compared with the ordinary operation of revolving the adjusting screw at the rear end of the tail stock and setting and releasing the usual additional clamping set screw or eccentric for the center.

The lost motion in the movement of the spindle 2, which may be obtained by retracting the tail stock screw 4 after cutting a piece of work of a certain length and when it is desired to insert and cut a shorter piece enables the handle 9 to be swung back farther than in its original movement and then moved forward again so as to carry the center forward a greater distance than in the first adjustment before the locking members come into action.

Having thus described my invention, what I claim is:

1. In combination with a lathe tail-stock, a spindle mounted therein, a center carried by the spindle, an adjustable screw at the end of the tail-stock having a free bearing against the end of the spindle, means for advancing and retracting the center toward and from the work in a limited range of movement determined by the adjustment of the tail-stock screw, and comprising a shaft, the axis of which is at right angles to the axis of the spindle and which has means of driving connection with said spindle and an operating handle for said shaft movable in a plane at right angles to the shaft axis.

2. In combination with a lathe tail-stock, a spindle mounted therein, a center carried by the spindle, an adjusting screw at the rear end of the tail-stock having a free bearing against the end of the spindle, a rack on said spindle, a shaft carrying a pinion adapted to mesh with said rack and freely movable back and forth with said spindle within the range of movement permitted by the tail-stock screw to adjust said center to pieces of work of varying lengths, and an operating handle for the pinion shaft.

3. In combination with a lathe center, a movable spindle therefor, an advancing and retracting member positively and permanently connected to the spindle, a locking member, and an operating handle connected to the advancing and retracting member to move the center against and from the work and having a positive operating connection with the locking member to lock the center in work engaging position.

4. In combination with a lathe center, a movable spindle therefor, a positively operated advancing and retracting member for the spindle fixed relatively to the longitudinal movement of the latter, and a positively operated spindle locking member movable transversely of the axis of the spindle into locking position, and a common handle for operating said members.

5. In combination with a lathe center, a spindle therefor, an operating handle, means fixed relatively to the longitudinal axis of the spindle for positively advancing the lathe center by the first part of the movement of said handle in one direction, and locking means also fixed relatively to the longitudinal axis of the spindle and positively operated to lock said center by the remaining movement of the handle in the same direction.

6. In combination with a lathe center, mechanism for advancing said center, means for locking said center, a common operating member for said mechanism and means, a handle for said operating member and means of releasable connection between said member and the advancing mechanism adapted to be disconnected by the pressure of the center against the work.

7. In combination with a lathe center, means for advancing the center toward the work, means for locking the center, an operating handle for said means, a releasable clutch between said handle and the advancing means and means to permit the disconnection of said clutch when the center presses against the work.

8. In combination with a lathe center, means for advancing the center toward the work, means for locking the center in position against the work, a handle, a member intermediate said handle and said advancing and locking means for operating the same and having a connection with the locking means which is inoperative during the first part of the movement of said member and a connection with the advancing means which is operative during said first part of the movement, means for disconnecting the handle from said advancing means when the center presses against the work and means whereby the further movement of the operating member effects the operation of the locking means.

9. In combination with a lathe center, mechanism for advancing said lathe center, means for locking said lathe center, a common operating handle, a common member intermediate said handle and said advancing and locking means, a spring-pressed releasable clutch between said member and the advancing mechanism operable to be released by the pressure of the center against the work, and means carried by said member for operating the locking means after said member and the advancing means have been disconnected, said operations being effected by the movement of the operating handle in one direction.

10. In combination with a lathe center, a rotatable shaft extending transversely of the lathe center, a gear connection for advancing said center, a releasable clutch between said shaft and said gear mechanism, a spring pressing against said clutch, a locking dog, said shaft being provided with screw threads adapted to effect the travel of said dog to obtain a locking adjustment thereof after the center has been advanced against the work.

11. In combination with a lathe center, a spindle in which said center is carried, said spindle being provided with a rack, a pinion, a shaft on which said pinion is loosely mounted, a clutch member carried by said pinion, a spring-pressed clutch member fixed on said shaft against rotation and adapted to engage said first clutch member, a sliding locking dog adapted to engage said spindle and screw threads on said shaft for causing said dog to travel longitudinally of the shaft and an operating handle for said shaft.

12. In combination with a lathe center, a spindle carrying the same, a swinging handle lever, an advancing and retracting member geared to the spindle, a positive spindle locking member and means operable by a single movement of said handle in one direction for both operating said advancing member to positively advance the center and positively operating said locking means.

13. In combination with a lathe center, a stop member for determining the approximate work length distance between centers, means for advancing and locking said center independently of said stop member and a swinging operating handle for successively effecting such advancing and locking actions in a single movement thereof in one direction.

In witness whereof, I have hereunto set my hand and seal at Indianapolis, Marion county, Indiana this eighth day of November, A. D. nineteen hundred and sixteen.

NICHOLAS D. CHARD. [L. S.]

Witnesses:
C. NICOLAY,
LODGE CHARD.